INVENTOR.
QUINTON W. SIMKINS
BY [signature]
ATTORNEY

March 25, 1969 Q. W. SIMKINS 3,435,429

MAGNETIC FILM STORAGE SYSTEMS PROVIDING CANCELLATION OF SPURIOUS NOISE SIGNALS

Filed June 30, 1964 Sheet 2 of 4

3,435,429
Patented Mar. 25, 1969

3,435,429

MAGNETIC FILM STORAGE SYSTEMS PROVIDING CANCELLATION OF SPURIOUS NOISE SIGNALS

Quinton W. Simkins, Poughkeepsie, N.Y., assignor to International Business Machines Corporation, New York, N.Y., a corporation of New York Filed June 30, 1964, Ser. No. 379,165
Int. Cl. G11b 5/06
U.S. Cl. 340—174 16 Claims

ABSTRACT OF THE DISCLOSURE

A magnetic film storage system in which spurious noise signals, arising from capacitive coupling between word lines and sense lines and, also, from inductive coupling between bit and sense lines, are effectively cancelled by utilizing half bit lines.

This invention relates to magnetic film storage systems, and more particularly, to circuits employed with, and to a method of operation of such arrays providing spurious noise cancellation and improved operating characteristics.

Use of magnetic and ferro-magnetic elements capable of being magnetized stably in either one of two possible states for storage of complementary digital values, such as are commonly indicated by the numerals "0" and "1," is well known in the digital computer art. Such magnetic elements are readily adaptable to control by magnetic switching fields for switching between the stable states to either store or read out desired digital information.

Magnetic film memories offer highly advantageous characteristics ideally suited to the requirements of magnetic storage systems. In addition to providing very fast switching while maintaining excellent thermal properties, thin film memories may be formed by bulk fabrication processes, thus enabling low production costs. The usual fabrication process comprises the deposition of a nickel-iron alloy (usually the non-magnetostrictive type of 81% Ne-19% Fe composition) in a thin film of a thickness of 500 to 2,000 A. on a planar substrate of either conductive or insulating material. The deposition may be achieved by plating, by vacuum evaporation, or by sputtering, a magnetic field being imposed during the deposition to achieve uniaxial anisotropy, i.e. a preferred or easy axis of remanent magnetization of the film.

Due to the extreme thinness of the layers, the films have very low flux characteristics, requiring only a relatively low amplitude drive or switching field and consequently being subject to only minimal heating effects, even at very high switching frequencies. The switching time of the films, when employed in a practical system, is approximately 5 nanoseconds for fields of approximately 10 oersteds. In addition, the relatively simple configuration of a planar substrate-supported film provides relatively high bit-density storage and permits the use of low-impedance strip transmission lines for high-frequency pulse distribution. Thus, thin film memories provide operating characteristics compatible with high speed and large capacity requirements of an efficient storage or memory system.

Thin magnetic film memories usually are constructed as word-organized or two-dimensional memories, having coincident-current write but non-coincident-current read. A first set of generally parallel lines, commonly called "word lines," lies in a common plane parallel to the substrate-supported fim. A second set of generally parallel pairs of first and second parallel lines, commonly called bit and sense lines respectively, lie in a common plane parallel to the substrate-supported film and in a direction transverse to the first set of lines.

Within the grid arrangement, the lines of the first and second sets may intersect in an orthogonal relationship or in a parallel relationship, the intersections defining magnetic interaction regions which, in the case of a continuous film, comprise a bit storage region therein, or, in the case of an array of discrete spots, are aligned therewith to be operative upon respectively associated spots.

In a word-organized thin film memory, two primary sources of spurious noise signals exist. The first source results from the unavoidable capacitive coupling which exists between word and sense lines and which causes a word signal or pulse on the word line to be coupled into each of the sense lines in the entire array which a given word line crosses. Ideally, of course, a signal is induced in the sense line only in response to the switching of the magnetic polarization within the film. The switching, however, is effectuated in response to a word or read signal on the word line. Thus, a signal on a word line not only causes the desired switching of the magnetic dipole in the film, but also causes a spurious noise signal to be capacitively coupled into the sense line.

The second source results from the unavoidable inductive coupling which exists between the parallel bit and sense lines. The parallel bit and sense line pairs commonly are 30 inches or more in length adjacent pairs being in very close proximity. Thus, upon the conduction of bit pulses through the bit lines, from both the bit line associated therewith and adjacent bit lines, there are inductively coupled into each sense line spurious noise signals of significant amplitude.

It is well recognized that for proper operation of thin magnetic films, the magnetic switching fields, and the pulses creating them, must have a rapid rise time. A pulse having a rapid rise time, however, is subject to very efficient coupling between a line in which it is propagating and adjacent conductors, thereby creating spurious noise signals in the latter. The spurious noise signals not only detrimentally affect the signal to noise ratio obtainable, but also reduce the speed of operation of the memory by lengthening the time interval which must elapse between the application of alternative write and read signals. Thus, the elimination of such spurious noise signals is essential not only for enabling proper operation of a magnetic film array but also for obtaining the benefit of its inherently rapid switching rate.

As noted, thin magnetic film memories may be formed on a suitable substrate either as a continuous film or as discrete spots. In the latter case, suitable masking techniques may be employed during the film deposition process or a film may be deposited initially in a continuous fashion and subsequently etched. Although the discrete spot approach provides an inherent isolation of an individual spot from surrounding spots, uniformity of film thickness and of spot dimensions is more difficult to achieve. Variation of the physical characteristics of the spots introduces a wider range of variations in the output signals provided thereby and also in the amplitude drive signals required for providing an adequate switching field.

Further, the discrete spots are inherently subject to deleterious "edge" effects; in essence, the edges of the spots did not switch in the presence of an appropriately applied field with the result that the signal output is reduced in comparison to a region of commensurate dimensions within a continuous film. An additional deficiency in the discrete spot approach comprises a tendency of the spots to demagnetize, with the result that higher intensity switching fields, and thus higher amplitude drive signals are required, while lower amplitude output signals are obtained.

The use of a continuous film inherently avoids the registration problem which arises in a discrete spot system and also avoids the undesirable magnetic properties of discrete spots. Thus, lower amplitude drive signals may be employed while higher amplitude output signals are obtained for each storage region within the film, as compared to a discrete spot of commensurate dimensions. Due to the greater uniformity of the storage regions within a continuous film, wider margins, i.e. the range of drive signal characteristics within which effective switching of the magnetic storage regions of film may be obtained, are provided.

However, a continuous film is subject to greater magnetic interaction between adjacent storage locations therein and, in fact, since neither the storage locations of a continuous film nor discrete spot storage locations have a closed flux path, both discrete spot and continuous film systems are relatively sensitive to fields from all sources. Thus, limitations are imposed on the storage density or, on the minimum permissible spacing of bit storage locations, either as regions in a continuous film or as discrete spots.

A continuous film is also more subject to the phenomenon of "creep." Creep is a form of disturb sensitivity of a magnetic film, generally manifested as irreversible flux changes within the film. Creep occurs both due to repetitive pulsing by drive signals and also due to stray fields from all sources, including the magnetic fields of adjacent bit storage locations. The effect of creep is to cause the magnetic domain walls to move, or propagate through the film, requiring subsequent information to be stored by the much slower, more time and energy-consuming process of domain wall switching, rather than rotation of the magnetic polarization. In addition, creep may become so extreme as to destroy information stored in the film.

In the fabrication of thin film memories, the substrate on which the film is deposited may be either of a conductive or a non-conductive material. In either instance, the strip lines, namely, the word, sense and bit lines, are usually terminated in their respective characteristic impedances to prevent deleterious reflections, either of noise or of the drive signals, from occurring.

In accordance with known techniques, however, there is provided a ground or return path from the terminating resistance to the source of input drive pulses, paralleling an associated strip line over the film element. In this manner, the magnetic storage locations under a given strip line are acted upon by two magnetic fields, a first one created by the propagation of a drive pulse through the strip line, and a second one created by the propagation of same drive pulse through the return path. The first and second magnetic fields reinforce one another, together providing the requisite switching energy.

Where a dielectric substrate is employed, suitable conducting lines must be provided thereon for the return paths. Such return conducting conductors are separated from the strip line by at least the thickness of the substrate and thus present an undesirably high impedance value. The high impedance thereof necessitates the generation of higher amplitude drive signals to provide the requisite switching fields. In addition the inductive reactance of the impedance effects a time delay in the propagation of the drive pulses with resultant reduction in operating speed and distortion of the drive signals, and the magnetic switching fields provided thereby, particularly as related to their desired rapid rise time.

Under relatively ideal conditions, a conductive substrate itself provides discrete return paths paralleling each associated strip line. This occurs due to the phenomenon that, in response to the flow of current in a given strip line, a current will tend to flow in a return path in the substrate passing directly under that strip line, such that the field energy in the system will be minimized.

The conductive substrate, however, is subject to another phenomenon, known as "ground plane current spreading." This spreading phenomenon occurs when the drive pulses applied to the strip line are of long duration or of a high repetition rate, representing a pulse wave envelope of long duration with an effective average D.C. value. In effect, the return path of a pulse propagated through the strip line departs from the ideal return path paralleling the strip line, with the result that not only is the magnetic switching field intended to be provided thereby depleted, but also the current propagating through the dispersed return path deleteriously interacts with adjacent storage locations.

The prior art has been ineffective in overcoming these various deficiencies arising in the formation of a thin magnetic film memory system. It has suggested the avoidance of spurious noise signals arising from inductive coupling between bit and sense windings, heretofore described, through the use of a memory array in which two magnetic storage locations are provided for the storage of each bit of information. However, the prior art has not suggested a technique for eliminating spurious noise arising from capacitive coupling between word lines and sense lines, nor has it been successful in eliminating both such spurious noise signals in combination. Further, the prior art has not provided any solution to avoiding the interaction effects arising either in discrete spot or continuous film storage arrays, nor for the ground plane current spreading problem occurring in a conductive substrate, nor of either of these effects in combination with cancellation of spurious noise signals.

The present invention, however, provides a system having higher output signal amplitudes than those obtainable in the prior art while additionally providing effective cancellation of spurious noise signals from both inductive and capacitive coupling. Further, the system of the present invention reduces, and in some cases, totally eliminates various deleterious interactions and other defects of magnetic film memory arrays such as have been hereinbefore set forth.

It is, therefore, an object of this invention to provide an improved method for operating a thin film magnetic memory array.

Another object of this invention is to provide a circuit offering improved operation of a thin film magnetic memory array.

It is a further object of this invention to provide a method of operation and a circuit for operating a thin magnetic film memory array achieving cancellation of deleterious noise signals in writing and reading operations.

It is still another object of this invention to provide a method of operation and a circuit for operating a thin film magnetic memory array achieving cancellation of ground plane current spreading effects in a conductive substrate.

It is still a further object of this invention to provide a method of operation and a circuit for operating a thin film magnetic memory array achieving cancellation of magnetic flux effects from any randomly selected storage location at any remote portion therefrom within the film.

Yet another object of this invention is to provide a method of operation and a circuit for operating a thin film magnetic memory array which inherently limits creepage effects within the film.

Many other objects and advantages of this invention will become apparent as the following description proceeds.

In accordance with one preferred embodiment of the invention, there is provided a word-organized thin film magnetic memory array having, in inductively coupled relation therewith, first and second parallel word lines passing parallel to the remanent, or easy axis of magnetization of the film and parallel pairs of associated component first and second half-bit and first and second half-sense lines passing transverse thereto. The intersections of the word lines with the first and second half-bit lines and the first and second half-sense lines create an array of first and second interaction regions defining, respectively, in the thin magnetic film, a bit storage location comprising first and second component half-bit stores. In the storage or registration of information in a selected bit storage location, bit pulses of opposite polarity in either a first or a second relation are propagated through the first and second half-bit lines, coincident with the propagation of a word pulse through the word line associated therewith. The resultant magnetic switching field effects rotations of the magnetic polarizations of the first and second half-bit stores in respectively opposite directions to remanent states of polarization of a corresponding first or a second relation. For read-out of a selected storage location, a word pulse is applied to the word line associated therewith, driving the magnetic polarization of the first and second component half-bit stores through oppositely directed rotations, and inducing in the first and second half-sense lines, respectively, first and second half-sense signals of opposite polarity. The half-sense signals are differentially added to provide a full sense signal, the differential addition cancelling spurious noise capacitively coupled into the half-sense lines from the word line. For the cancellation of spurious noise inductively coupled into the half-sense lines from the half-bit lines, there is provided a duplicate word-organized memory having non-concurrently read-out word lines but parallelly driven half-bit lines. The duplicate memory serves as a noise generator, concurrently creating spurious noise signals inductively coupled from the parallelly driven half-bit lines into the half-sense lines thereof, a differential addition of the full sense signal and the noise signal from the duplicate memory effecting cancellation of the inductively coupled noise.

Many other objects and advantages of the invention will become apparent from the following detailed description and drawings, wherein.

Figure 7:
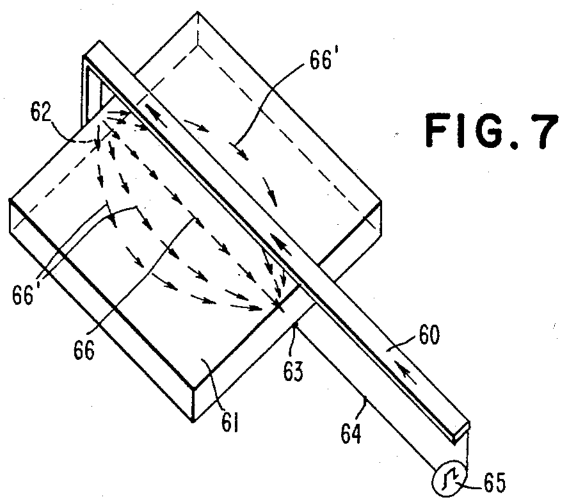
FIGURE 7 is a diagrammatic illustration of ground plane current spreading effects in a thin magnetic film.
Figure 8A:
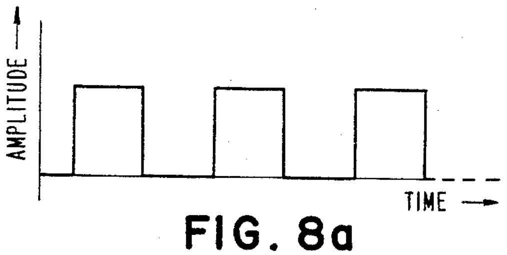
Figure 8B:
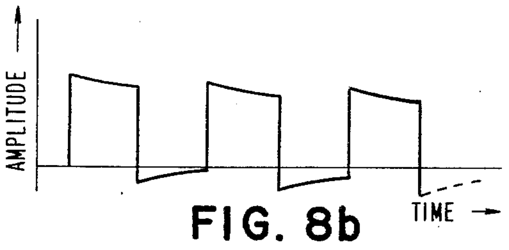
Figure 9:
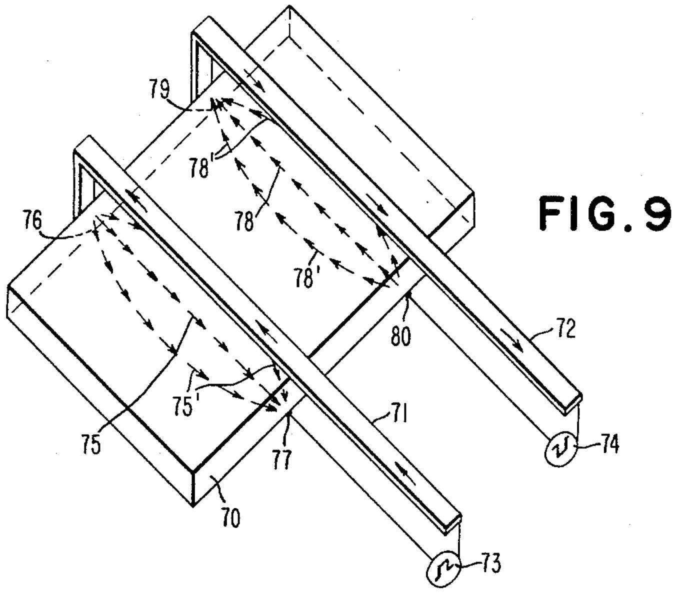
Figure 10:
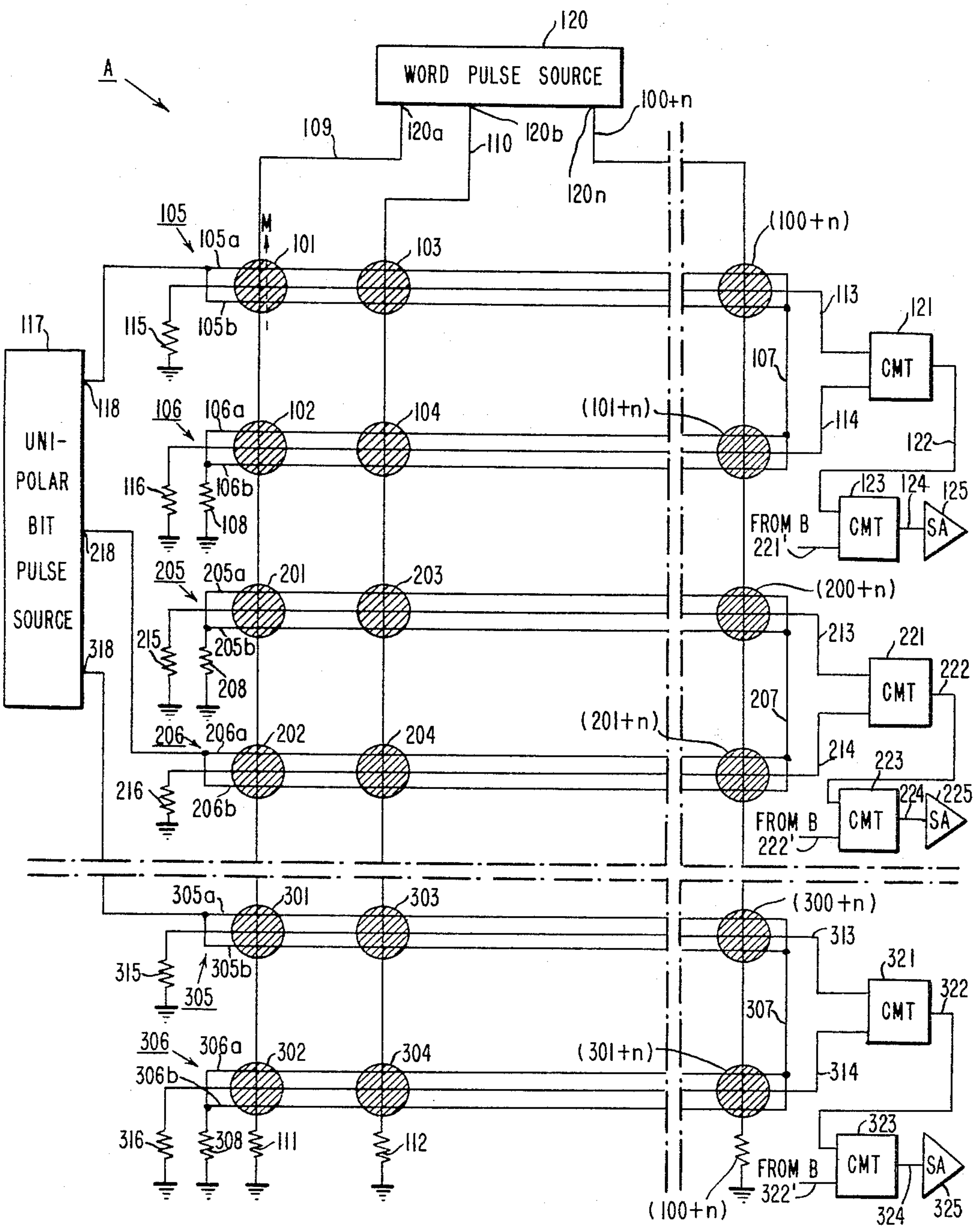

FIGURE 8*a* is a wave form of drive pulses applied to the system of FIGURE 7;

FIGURE 8*b* is a wave form representing the magnetic switching field in the presence of ground plane current spreading;

FIGURE 9 is a diagrammatic representation of the reduction of ground plane current spreading effects in accordance with the invention; and FIGURE 10 is a schematic showing a thin film magnetic memory operated in a unipolar pulsing mode in accordance with the invention.

Figure 1:
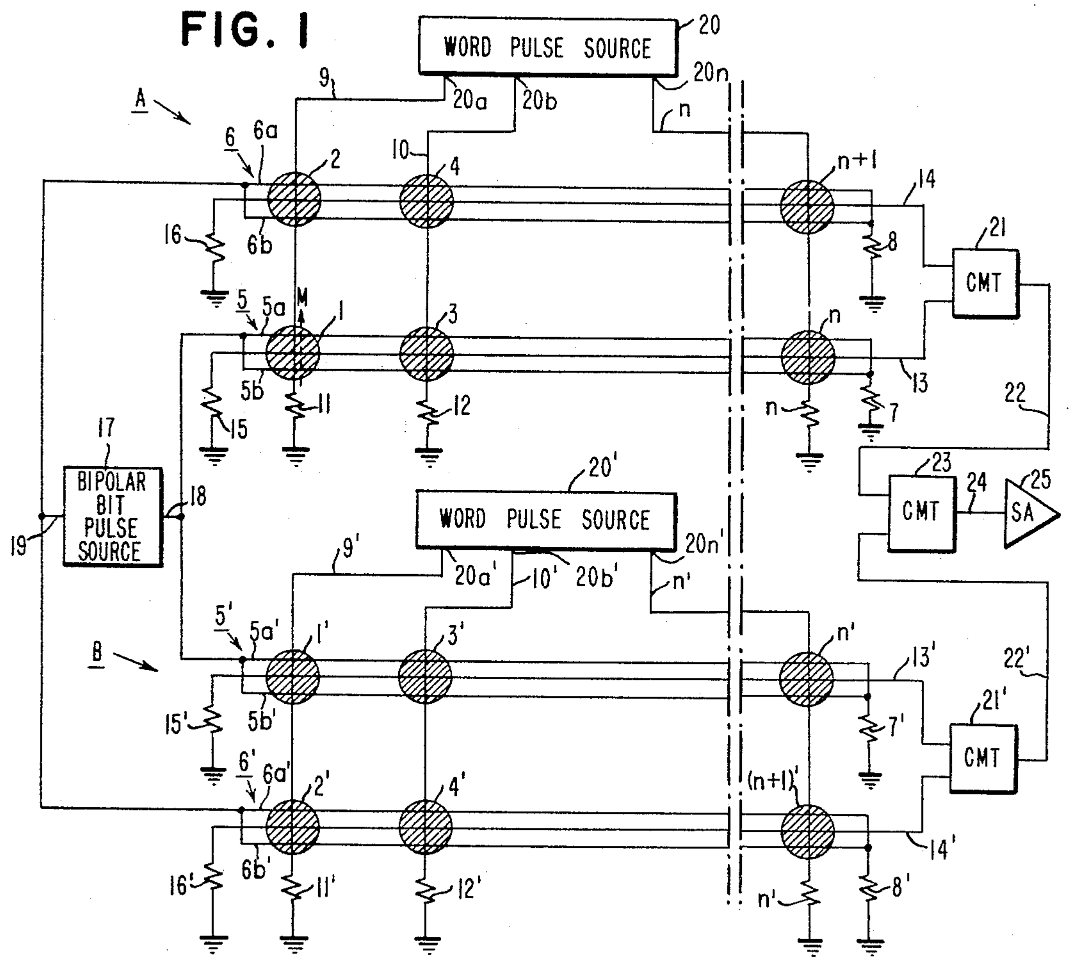
FIGURE 1 is a schematic showing a thin film magnetic memory operated in a bipolar pulsing mode in accordance with the invention.

In FIGURE 1, there is shown a schematic of a thin film magnetic storage system providing component half-bit stores in accordance with the invention and achieving cancellation of both inductively coupled and capacitively coupled spurious noise. Memory array A is of the word-organized type and includes a plurality of half-bit stores 1, 2, 3, 4, . . . *n*, and (*n*+1). The half-bit stores 1, 2, . . . (*n*+1), may be discrete spots or defined regions within a continuous film. The film, however, is formed to have a characteristic of uniaxial anisotropy, the "easy" axis being parallel to the word line, in accordance with standard techniques, as indicated by the arrow M overlying half-bit store 1 and adjacent word line 9. Half-bit stores 1 and 2 operate as a component pair and constitute a single bit storage location for the storage of a single information bit or value. Likewise, stores 3 and 4 and stores *n* and (*n*+1) operates as component half-bit stores.

Half-bit line 5 passes, as a split line constituting segments **5*a* and 5*b*, over the half-bit stores 1, 3**, . . . and *n*, and half-bit line 6 passes, as a split line constituting segments **6*a* and 6*b* over half-bit stores 2, 4**, . . . and (*n*+1). Half-bit lines 5 and 6 are terminated in their respective characteristic impedances 7 and 8 to prevent reflection of bit pulses.

The purpose of splitting bit lines 5 and 6 into their respective segments **5*a*, 5*b* and 6*a*, 6*b*, respectively, is to provide a more uniform field for effecting the switching operation of the magnetic polarizations of the half-bit stores such as 1 and 2**.

A plurality of word lines 9, 10, . . . *n*, pass over an associated column of half-bit stores, illustratively, word line 9 passing over half-bit stores 1 and 2, and word line 10 passing over half-bit stores 3 and 4, in inductively coupled relationship therewith and being terminated in their respective characteristic impedances 11 and 12. Although for ease of illustration, only a single bit storage location has been shown associated with each of the word lines 9, 10 . . . *n*, a plurality thereof are provided in a practical system, each word line defining a word comprising a plurality of bits.

Half-sense lines 13 and 14 pass over half-bit stores 1, 3, . . . and *n*, and 2, 4, . . . and (*n*+1), respectively, and are terminated in their respective characteristic impedances 15 and 16.

A second word-organized thin film magnetic memory array B is constructed in adentical fashion to the memory array A, identical elements being indicated by identical, but primed numerals. There are provided a plurality of half-bit stores 1′, 2′, . . . *n′* and (*n*+1)′; half-bit line 5′, having split segments **5*a*′ and 5*b*′, and half-bit line 6′, having split segments 6*a*′ and 6*b*′, and terminated in their respective characteristic impedances 7′ and 8′; word lines 9′, 10′**, . . . *n′* terminated in their characteristic impedances 11′, 12′, . . . *n′*; and half-sense lines 13′ and 14′ terminated in their respective characteristic impedances 15′ and 16′. Memory array B likewise includes a magnetic film of uniaxial anisotropy having an easy axis parallel to the arrow M, shown overlying half-bit store 1.

A bipolar bit pulse source 17 is connected at a first common terminal 18 thereof to the half-bit lines 5 and 5′ and at a second terminal 19 thereof to half-bit lines 6 and 6′. The bipolar drive unit 17 is capable of providing selectively a positive bit pulse at terminal 18 and a negative bit pulse at terminal 19 and, alternatively, of providing a negative bit pulse at terminal 18, and a positive bit pulse at terminal 19, thus constituting, respectively, first and second relations of opposite polarity bit pulses for concurrent application to the half-bit lines 5, 6 and 5′, 6′, of arrays A and B respectively.

The arrays A and B are provided with independently operable word pulse sources 20 and 20′, respectively. Word pulse sources 20 and 20′ include terminals **20*a*, 20*b*, 20*n*, and 20*a*′, 20*b*′, 20*n*′, respectively, and are operable for providing a word pulse to a selected one thereof for independent pulsing of the word lines 9, 10**, *n*, and 9′, 10′, *n′* respectively connected thereto. Each of the arrays A and B is provided with a common mode trap 21 and 21′, respectively, which receive as inputs thereto, signals induced in the half-sense lines 13 and 14, and 13′ and 14′, respectively. The common mode traps 21 and 21′ effect a differential addition of the half-sense signals supplied thereto from the associated half-sense lines and provide full sense signals on their respectively associated full sense lines 22 and 22′. The full sense lines are connected to a third common mode trap 23, which likewise performs a differential addition, the output signal of which is supplied through output line 24 to a sense amplifier 25.

In accordance with known techniques for effecting storage in a magnetic film of uniaxial anisotropy by orthogonal pulsing techniques, the word pulse, propagating down a word line passing parallel to the easy axis of the film, creates a magnetic switching field which rotates the magnetic polarization of the film to an unstable position transverse to the easy axis, called the "hard" axis. The word pulse commonly is 600 to 700 milliamps and creates a magnetic switching field of 10 to 15 oersteds.

Although stated to be coincident, the bit pulse actually follows the word pulse by a slight delay, but does exist concurrently therewith for a portion of its time interval. The bit pulse commonly is 250 to 350 milliamps and creates a magnetic switching field of ½ to 1 oersted. The magnetic switching field created by the bit pulse rotates the magnetic polarization from the unstable position along the hard axis to a position of magnetic remanence parallel to the easy axis and in a direction determined by the polarity of the bit pulse. Thus, the storage of a "0" or a "1" is manifested by selectively rotating the magnetic polarization of the predetermined storage location in the film to a selected one of two oppositely directed remanence positions along the easy axis.

To effect read-out, or sensing, of the stored information, a word or read pulse is supplied to the word line, rotating the magnetic polarization to the hard axis, and inducing a sense signal in a sense line inductively coupled to the storage location in the film. Since there are two opposite directions of rotation to the "hard" axis from the opposite directions of remanence along the easy axis, in accordance with the stored information, the sense pulses will be of opposite polarity, thereby, indicating the stored information bit value to be a "0" or a "1."

In the operation of the system of FIGURE 1, an information bit value may be registered in a selected bit storage location within either one or the other of the memory arrays A and B. In accordance with standard digital notation, the information bit value may be either a "1" or a "0." For illustrative purposes, however, the registration, and the sensing, or read-out, of an information bit value will be related to memory array A.

The system of FIGURE 1 operates in the orthogonal mode and requires generally coincident drive pulses on both the half-bit lines and on the word line associated with each half-bit store. Thus, to store a given information bit value, such as a "1," in the location comprising the component half-bit stores 1 and 2, a word pulse is supplied to word line 9 by word pulse source 20, concurrently with the supply of opposite polarity bit pulses of a first relation through half-bit lines 5 and 6 from bipolar bit pulse source 17.

The concurrent presence of a word pulse of a positive polarity on word line 9 with bit pulses of a first relation of opposite polarities on bit lines 5 and 6 will effect a switching of the magnetic polarization of half-bit stores 1 and 2 to alignment in opposite directions along the easy axis indicated by arrow M. If the bit pulse on half-bit line 5 is of positive polarity, the magnetic polarization will switch to the direction of arrow M in half-bit store 1 and opposite to that direction in half-bit store 2. This status, therefore, constitutes a first relation of opposite magnetic polarization of half-bit stores 1 and 2, representing the storage of a "1."

To store a "0" information bit value, bipolar bit pulse source would be operated to supply opposite polarity bit pulses in the second relation to half-bit lines 5 and 6. As a result, a second relation of magnetic polarizations of half-bit stores 1 and 2 would be established, the polarization of half-bit spot 1 being directed oppositely to arrow M and the polarization of half-bit spot 2 being directed the same as arrow M.

To read-out, or sense, information stored in a selected memory location, such as that constituted by the half-bit stores 1 and 2, a word or read pulse is supplied to word line 9. The read pulse, again by inductive coupling, switches the magnetic polarizations of the half-bit stores 1 and 2 to a horizontal position, directed to the right, along the hard axis. In either of the first or second relations of magnetic remanence polarizations of half-bit stores 1 and 2, the switching will effect opposite rotations of the polarizations to assume this state. The opposite directions of rotation of the magnetic polarizations induce first and second sense signals of opposite polarity in the half-sense lines 13 and 14, respectively, and of a first or a second relation corresponding respectively to a first or a second relation of stored information in half-bit stores 1 and 2.

The sense signals induced in half-sense lines 13 and 14 propagate to a common mode trap 21 which performs a differential addition thereof. Since the sense signals are of opposite polarities, the differential addition performed by common mode trap 21 produces a full sense signal on line 22. The full sense signal is of a magnitude twice that of the first and second sense signals and of either a positive or negative polarity, determined by the relation of the polarities of the first and second sense signals, indicating either a stored information bit value of "1" or "0."

As hereinbefore set forth, a primary source of noise results from capacitive coupling between word lines, such as the word lines 9, 10 . . . *n* and sense lines, such as the half-sense lines 13 and 14. Since the word line 9 passes transverse to sense lines 13 and 14, the effect of inductive coupling therebetween is minimal; however, the unavoidable capacitive coupling, particularly due to the relatively high current level of the word pulses present on word line 9, will create spurious noise signals in half-sense lines 13 and 14.

The word pulse propagates through the word line and in a common direction across each of the component half-bit stores of each bit storage location associated therewith, such as the single bit storage location defined by half-bit stores 1 and 2. Therefore, the spurious noise signals capacitively coupled into the half-sense lines 13 and 14, respectively associated with half-bit stores 1 and 2, will be of a common polarity and essentially of identical waveforms. These spurious noise signals propagate through half-sense lines 13 and 14 and, due to their common polarity, are cancelled by the differential addition performed by common mode trap 21. The full sense signal on full sense line 22 is therefore devoid of spurious noise from capacitive coupling effects.

A second primary source of spurious noise in thin film magnetic memories has been noted to arise from inductive coupling between bit lines and sense lines. In the schematic of FIGURE 1, only a few half-bit stores have been shown for purposes of illustration. However, it should be appreciated that the bit lines 5 and 6, or their respective split segments 5*a*, 5*b* and 6*a*, 6*b*, extend in parallel relation for distances of as much as 30 inches in close proximity to their respective half-sense lines 13 and 14.

In a practical system, a plurality of such associated pairs of half-bit lines and sense lines extend in closely adjacent, parallel relation across the array. Since, in the operation of a prior art word-organized memory, each bit line is pulsed selectively, but concurrently, a significant amount of spurious noise will be coupled into each sense line, not only from its associated bit line, but also from adjacent bit lines.

In accordance with the invention, however, for either the first or second relations of opposite polarities of the bit pulses applied to the half-bit lines 5 and 6, the current passed therethrough will be oppositely directed. The magnetic fields created by the bit pulses will likewise be oppositely directed and in opposing relationship. The resultant field of the two opposing fields created by the pulses therefore will tend to cancel. Thus the effect of bit pulse propagation through a component pair of half-bit lines on an adjacent component pair is minimized and, at a sufficiently remote position, totally eliminated. Thus, a first order of cancellation of inductively coupled spurious noise signals from the half-bit pulses is achieved.

However, noise signals are induced in the half-sense lines, such as 13 and 14, due to bit signal propagation in the respectively associated half-bit lines, such as 5 and 6. Since current propagates in half-bit lines 5 and 6 in opposite directions, however, the noise signals in half-sense lines 13 and 14 are of opposite polarity. Upon propagation to common mode trap 21, these noise signals are added by the differential addition therein and appear with the desired full sense signal on full sense line 22.

Thus, a spurious noise signal from inductive coupling is added in the common mode trap 21 and present in the full sense line 22, along with the desired full sense signal.

To eliminate this undesirable spurious noise, there is provided, in accordance with the invention, a spurious noise signal of equal magnitude and common wave form from the identical memory array B. Simultaneously with the supply of half-bit pulses from bit pulse source 17 from its terminals 18 and 19 to the half-bit lines 5 and 6 of array A, an identical relation of opposite polarity half-bit pulses is supplied to the half-bit lines 5' and 6' of array B. Regardless of the magnetic remanence polarization existing within any of the half-stores 1', 2', . . . $(n+1)'$ of array B, the bit signals present on half-bit lines 5' and 6' propagate therethrough to induce in half-sense lines 13' and 14' respectively, spurious noise signals identical to those created within the half-sense lines 13 and 14 of array A.

The spurious noise signals induced in half-sense lines 13' and 14' of array B are of opposite polarities, in accordance with the explanation thereof as related to array A, and, upon differential addition in common mode trap 21', produce on full sense line 22' a spurious noise signal of identical wave form and of the same polarity as that produced on full sense line 22.

It should be noted that the bit pulses in half-bit lines 5' and 6' are of insufficient magnitude to effect any change in the magnetic remanence polarization of any of the half-bit stores 1', 2', . . . $(n+1)'$. Further, no word pulses are present on word lines 9', 10', . . . $n'$, since word pulse source 20' is operated independently of, and never concurrently with word pulse source 20. Thus, it will be appreciated that no effect is had upon any information stored within any of the half-bit stores 1', 2', . . . $(n+1)'$ of array B during the generation therein of spurious noise signals. Furthermore, the bit pulses in half-bit lines 5' and 6' are not effected by the magnetic polarization of stored information in array B and thus, the spurious noise signals produced are of common wave form to those produced in array A.

The spurious noise signals from inductive coupling within both arrays A and B are present in full sense lines 22 and 22', respectively, and are of common polarity. Therefore, upon differential addition thereof in common mode trap 23, they are cancelled, producing on output line 24 a full sense signal devoid of spurious noise from inductive coupling, and, as hereinbefore set forth, likewise devoid of spurious noise from capacitive coupling. The full sense signal on line 24 is of either a positive or negative polarity, providing an output indication of the "1" or "0" value, respectively, of the stored information bit. The full sense signal is then supplied to a sense amplifier 25 or other utilization apparatus.

Figure 2:
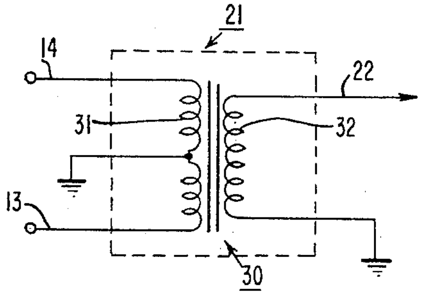
FIGURES 2 and 3 are schematics of circuits employed and shown in block diagram in FIGURE 1.

In FIG. 2 is shown a schematic of a common mode trap suitable for use in this invention. Illustratively, common mode trap 21 (or 21') of FIG. 1 is indicated in FIG. 2 as including a transformer 30 having a center-tapped primary winding 31 and a secondary winding 32. Half-sense lines 13 and 14 (or 13' and 14') are connected to the output terminals of the center-tapped primary winding 31 and the center tapped terminal thereof is connected to ground. One terminal of the secondary winding 32 is grounded and the other terminal thereof is connected to the full sense line 22.

In operation, the sense signals derived from interrogation of the component half-bit stores of a selected information storage location, since they are of opposite polarity, induce aiding voltages in the two halves of primary winding 31 and couple into the secondary winding 32 a voltage of twice the magnitude of either of the sense signals. The polarity of the output signal induced in secondary winding 32 will be determined by the relation of the magnetic polarizations of the component half-bit stores, and thus the relation of the opposite polarity sense signals.

Figure 3:
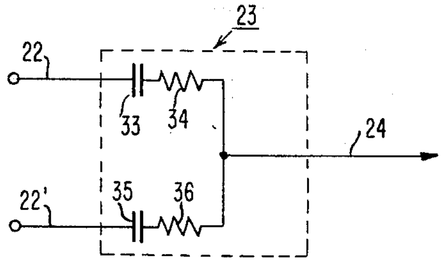

In FIG. 3, the common mode trap 23 of FIG. 1 is represented as including a first RC input network comprising capacitor 33 and resistor 34 connected to the full sense line 22 from array A and a second RC input network comprising capacitor 35 and resistor 36 connected to the full sense line 22' from array B. Spurious noise signals present on full-sense lines 22 and 22' are of the same polarity and will create equal voltage drops across the associated RC networks, effecting a cancellation thereof at their common junction. The common mode trap 23 of FIG. 3 is more desirable for use, as indicated in FIG. 1, at the input to sense amplifier 25 due to its more desirable signal matching characteristics.

Circuits providing differential addition of signal voltages are, of course, well known in the art and any such circuits may be employed in place of those schematically indicated in FIGS. 2 and 3 for attaining the benefit of the invention.

Figure 4:
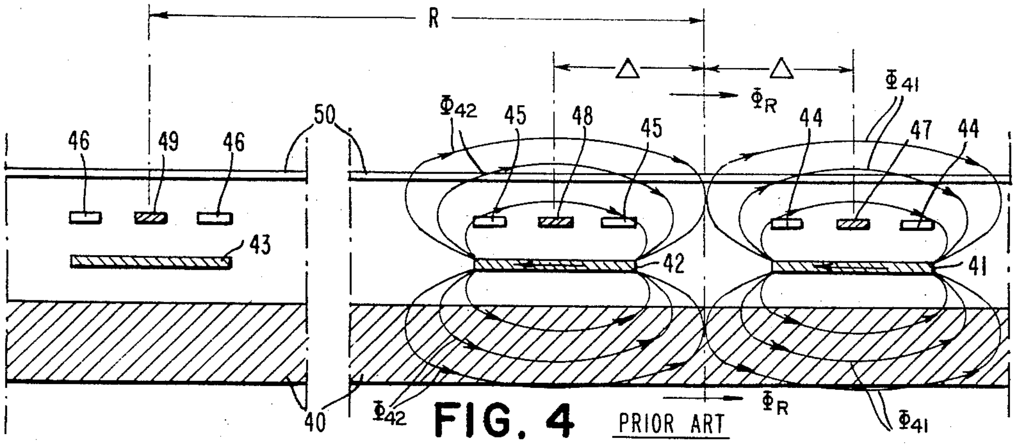
FIGURES 4, 5 and 6 are diagrammatic illustrations of magnetic flux fields existing within thin magnetic film memories.
Figure 5:
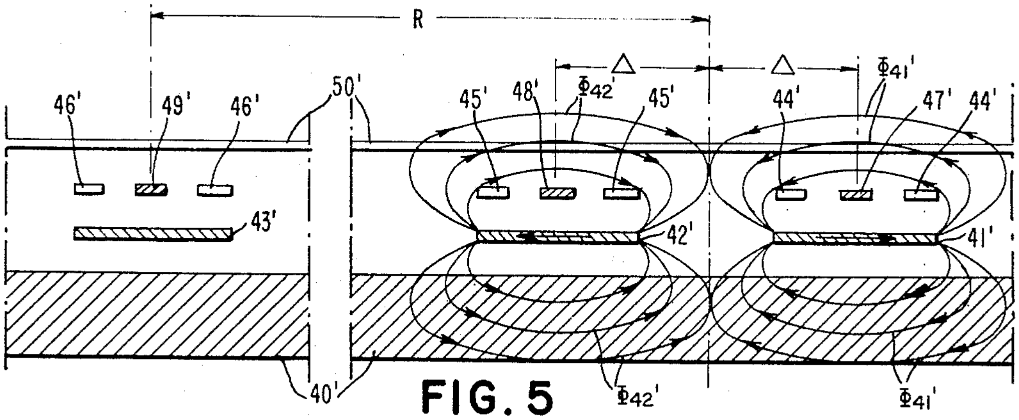

In FIGS. 4 and 5 there is depicted, on a greatly enlarged scale, a small segment of a magnetic film memory array representing magnetic flux field conditions existing therein. In both FIGS. 4 and 5, there is shown a substrate 40 which, in accordance with known techniques, has suitable insulating layers thereon (not shown) for supporting a thin magnetic film storage system, such as represented by the spots 41, 42 and 43, and a system of strip transmission lines for pulse distribution. Segmented bit-lines 44, 45 and 46, and sense-lines 47, 48 and 49, are shown respectively associated with the storage spots 41, 42 and 43. In addition, a word line 50 extends in inductively coupled relationship with each of the storage spots 41, 42 and 43.

FIG. 4 depicts the common, or prior art, manner of operating a thin film memory. Between any two adjacent storage spots, such as 41 and 42, located at random throughout the memory array of storage spots, there is a significantly high probability of a common orientation of the magnetic polarization. Illustratively, this is indicated as being directed to the left in the drawing by the arrows positioned interiorly of the storage spots 41 and 42. The flux fields $\Phi_{41}$ and $\Phi_{42}$ of the storage spots 41 and 42 respectively are thus in additive relation, creating a resultant flux field $\Phi_R$.

The effect of the resultant flux field $\Phi_R$, is to disturb the magnetic remanence polarization existing within the storage spot 43. Spot 43 is indicated to be at a remote position, measured by the distance R from the center line of the two randomly selected, adjacent storage spots 41 and 42. The effect of the resultant flux field $\Phi_R$ on spot 43 is an inverse function of the square of the distance R summed over all such similarly polarized storage spots and reduced by the resultant flux field of all oppositely polarized storage spots.

In FIG. 5, there is indicated the flux fields of a memory array of identical construction to that indicated in FIG. 4 but operated in accordance with the teachings of the invention. For clarity, identical elements are indicated by identical, but primed numerals in FIG. 5. In this instance, the storage spots 41' and 42' represents any two randomly selected component half-bit stores defining a single memory location. The magnetic remanence polarizations of the storage spots 41' and 42' are, in accordance with the operation effected thereon by the system of FIG. 1, of opposite orientation, whether in the relation indicated by the arrows, or in the opposite relation. The magnetic flux fields $\Phi_{41'}$ and $\Phi_{42'}$ of the two storage spots 41' and 42', respectively, will be opposing one another in either relation.

Storage spot 43' is located a distance R from the center line of the storage spots 41' and 42' $\Delta$ indicating the distance from the center line of each of the spots 41' and 42′, to their common center line. Where R is large compared to Δ, due to the opposite magnetic polarization of the spots 41′ and 42′, the flux $\Phi_{41'}$ of spot 41′ cancels the flux $\Phi_{42'}$ of spot 42′, and there will be no resultant flux to deleteriously affect the storage spot 43′.

Figure 6:
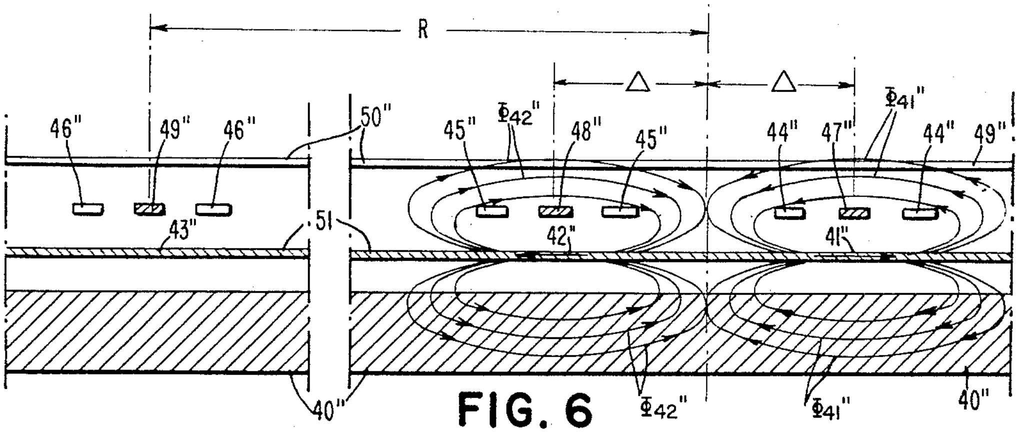

In FIGURE 6 there is shown a thin film magnetic storage system employing a continuous magnetic film 51 but in which the other elements of the memory array are identical to those of FIGURES 4 and 5 and indicated by identical, doubly-primed numerals. As hereinabove noted, the half-bit storage system of FIG. 1 is fully applicable to a continuous film memory, as distinguished from discrete spot memory such as represented in FIG. 5.

The susceptibility of a continuous film to greater interaction between adjacent storage location is readily appreciated by reference to FIG. 6. The regions 41″ and 42″ are defined only in relation to the magnetic switching fields produced by the respectively associated bit lines 44″ and 45″, and the word line 50″. Thus, the field interaction effects, particularly the "creep" phenomenon hereinbefore discussed, are reinforced and the deleterious effects thereof are more pronounced.

However, in accordance with the invention and as illustrated, the component half-bit stores 41″ and 42″ will always be of opposite magnetic polarizations, effecting cancellation of their respective flux fields $\Phi_{41''}$ and $\Phi_{42''}$. As a result, the resultant flux field effect on a remote storage region 43″ is minimized, in accordance with the discussion of FIG. 5.

As hereinbefore noted, a conductive substrate provides low impedance return paths only under relatively ideal conditions. The usual mode of operation, and the resultant ground plane current spreading resulting therefrom are indicated in FIG. 7. Strip line 60 is positioned parallel to conductive substrate 61 and in inductively coupled relation therewith. The strip line 60 is electrically connected to the substrate at the point 62 and a second contact is made to the subtrae 61 at 63 by lead 64 to complete the circuit to a signal source 65.

When a current pulse is propagated through strip transmission line 60, the magnetic field created thereby is inductively coupled to a magnetic film (not shown) deposited on top of substrate 61. Under relatively ideal conditions, requiring short duration pulses of low repetition rates, the current pulse returns through a defined return path within the substrate, under the strip line 60 and thus between the contact points 62 and 63, as indicated by the straight line of arrows 66.

Under usual operating conditions, however, the pulses applied to line 60 will be of a high repetition rate, as indicated by the waveform of FIG. 8*a*, representing current amplitude versus time. For either increasing repetition rates, or increased time durations of individual pulses applied to the strip transmission line 60, the return path 66 will diverge to assume ever broadening, more greatly dispersed return paths, as indicated by the paths of arrow 66′.

The graph of FIG. 8*b* is a plot of switching field amplitude as a function of time. The waveform indicates the distortion which occurs in the switching field due to the ground plane current spreading of the pulses in the return path. Due to the distortion, the switching field is weakened and higher current drive pulses must be supplied. The spreading, however, becomes more pronounced for higher current levels. Therefore, in an extreme case, it may be impossible to provide a switching field having the requisite energy, and the information will not be stored. An additional problem is that the divergent return paths may extend into portions of the substrate under adjacent storage locations with resultant disturbance effects on the information stored therein.

FIG. 9 represents a segment of a conducting substrate 70 of a thin film magnetic memory array operated in accordance with the invention. The segment is selected at random and represents the ground plane current in the conducting substrate 70 in the region of any two component half-bit stores (not shown). The strip transmission lines 71 and 72, therefore, represent any two component half-bit lines. Drive pulse sources 73 and 74 provide opposite polarity pulses to the strip lines 71 and 72, effecting current conduction in opposite directions through the strip lines 71 and 72, as represented by the arrows therein. The return paths of the pulses in substrate 70 will be in opposite directions also, as represented by the straight path of arrows 75 between the contact points 76 and 77 and the straight path of arrows 78 between the contact points 79 and 80.

Although the return paths 75 and 78 are subject to a spreading effect, represented by the divergent arrow paths 75′ and 78′, respectively, the extent of the spreading is limited due to the opposite directions of conduction therein. Thus, by minimizing the ground plane current spreading, the system of the invention limits interaction effects between adjacent storage locations and assures more accurate information registration and sensing, while permitting faster switching times.

The system shown in FIG. 10 comprises a uni-polar pulsing technique adapted to provide noise cancellation through the employment of component half-bit stores in accordance with the techniques of the invention hereinbefore set forth. The film employed in the system of FIG. 10 is of a type operable in a dispersion-locked mode, this mode of operation being disclosed in detail in a copending application entitled "Dispersion Locked Memory" of Bertelsen et al., Ser. No. 334,858, filed Dec. 31, 1963, and assigned to the assignee of the present invention.

As discussed in relation to the system of FIG. 1, a uniaxial anisotropic magnetic film is capable, theoretically, of remanent magnetization only along its so-called "easy axis." This characteristic is employed in the foregoing system to provide first and second relations of magnetic remanence polarization along the easy axis of the film to provide selective storage of one of two digital values, "0" or "1."

However, the theoretical uniaxial characteristic is not totally achieved in practice. A dispersion, or an angular variance in the actual direction of the easy axes, relative to the theoretically pure uniaxial characteristic, exists throughout the film. The copending Bertelsen et al. application describes the effect of dispersion in detail, and teaches a method and system for utilizing "dispersion locking," or magnetic remanence polarization along a hard axis, to provide a distinct storage position for a binary information bit value. A region of a continuous film constitutes a single storage location, and, for purposes of a convention, remanence along the hard axis in the region represents a binary "0" while remanence along the easy axis represents a binary "1."

In the Bertelsen et al. application, the switching of a remanent state in a storage region from the hard axis to the easy axis is accomplished by the application of concurrent fields to the region, one along the hard axis and the other along the easy axis. The easy axis field, by itself, is insufficient to switch the region from remanence along the hard axis to the easy axis. However, the fields together are sufficient to cause such switching. By contrast, the switching from the easy axis to the hard axis may be accomplished by a single field directed along the hard axis.

In the system of FIG. 10, a memory array A is shown which employs a thin magnetic film operable in the dispersion-locked mode. There are provided a plurality of half-bit stores 101, 103, . . . and (100+$n$) and their respective component half-bit stores 102, 104, . . . and (101+$n$). ($n$=1, 3, 5, . . . ). In like fashion, there are provided additional pluralities of half-bit stores 201, 203, and (200+$n$) and their respective component half-bit stores 202, 204, . . . and (201+$n$); and half-bit stores 301, 303, . . . and (300+$n$) and their respective component half-bit stores 302, 304, . . and (301+$n$).

There is provided a half-bit line 105, comprising split segments 105a and 105b, passing over the half-bit stores 101, 103, . . . and (100+$n$) and a half-bit line 106, comprising the split segments 106a and 106b, passing over the component half-bit stores 102, 104, . . . and (101+$n$). The half-bit lines 105 and 106 are connected in series by lead 107 and terminated in a series characteristic impedance 108. In like fashion, half-bit line 205, comprising split segments 205a and 205b, and a component half-bit line 206, comprising split segments 206a and 206b, are connected in series by lead 207 and terminated by a series characteristic impedance 208. Further, half-bit line 305, comprising split segments 305a and 305b, and its component half-bit line 306, comprising split segments 306a and 306b, are interconnected by lead 307 and terminated in series characteristic impedance 308.

Word line 109 passes in inductively coupled relationship over component half-bit stores 101, 102, 201, 202, . . . 301, 302, transverse to the bit lines respectively associated therewith, and is terminated in its characteristic impedance 111. The half-bit stores 301, 302, . . . (301+$n$) are shown separated from the half-bit stores 201, 202, . . . (201+$n$) to indicate that a large number of them may be provided in association with each word line. The totality of component half-bit stores associated with word line 109 comprise a single "word," each of the pairs of component half-bit stores, such as 101 and 102, constituting a single memory location for the storage of a digital information bit value.

In like fashion, word line 110 passes over the plurality of component half-bit stores 103 and 104, 203 and 204, . . . 303 and 304, and word 100+$n$ (where $n$=1, 2, 2, . . .) passes over component half-bit stores (100+$n$) and (101+$n$), etc. Word lines 110 and (100+$n$) are also terminated in their respective characteristic impedances 112 and (100+$n$).

Half-sense line 113 passes over the series half-bit stores 101, 103, . . . and (100+$n$) and half-sense line 114 passes over the respective component half-bit stores 102, 104, . . . and (101+$n$) in inductively coupled relationship therewith and parallel to the respectively associated half-bit lines 105 and 106. The half-sense lines 113 and 114 are terminated in their respective characteristic impedances 115 and 116. In like fashion, half-sense lines 213 and 214 are associated with the aligned half-bit stores 201, 203, . . . and 202, 204, . . . respectively, and are terminated in their respective characteristic impedances 215 and 216. Similarly, half-sense lines 313 and 314 pass over component half-bit stores 301, 303, . . . and 302, 304, . . . respectively, and are terminated in their respective charatceristic impedances 315 and 316.

Each of the bit lines 105, 205, . . . 305 are connected to a unipolar bit pulse source 117 at individual terminals 118, 218, 318, respectively, for selective but simultaneous pulsing thereof. In addition, each of the word lines 109, 110, . . . 100+$n$, is connected to terminals 120a, 120b 120n of word pulse source 120 for selective pulsing thereof. In operation, an entire word is registered in the array simultaneously, the word line being pulsed concurrently with the selective simultaneous pulsing of all of the half-bit lines. To illustrate this operation in a simplified manner, a single bit value of information is stored in a selected memory location, as constituted by the two component half-bit stores 101 and 102, by pulsing of the word line 109 and selective pulsing of the bit lines 105 and 106 associated therewith. As noted above, a single pulse, chosen to be the word pulse, suffices for rotating the magnetic polarization to a remanence state along the "hard axis." However, coincident word and bit pulses are required to rotate the magnetic polarization to an alignment along the easy axis for storage of a bit value of information.

Similarly to the orthogonal pulsing mode of FIG. 1, the easy axis of the dispersion-locked film employed in FIG. 10, as indicated by the dotted arrow M, shown in relation to half-bit store 101, is parallel to the word line 109 associated therewith, this condition being maintained throughout the entire array. To store a "0" bit value, a word pulse is applied to the word line 109 by word pulse source 120, creating a magnetic field directed to the right, and rotating the magnetic polarizations of both half-bit stores 101 and 102 to a remanence position along the hard axis, transverse to the arrow M and directed to the right in FIG. 10.

In the alternative, when it is desired to store a "1" in the component half-bit stores 101 and 102, coincident bit and word pulses are applied to the half-bit line 105 from the terminal 118 of unipolar bit pulse source 117 and to word line 109 from the terminal 120a of pulse source 120. In relation to half-bit store 101, the magnetic force fields created by the coincident pulses at the intersection of bit line 105 and word line 109 rotate the magnetic polarization thereof to a direction vertically upward in the drawing and thus parallel to, and in the same direction as the arrow M. The bit pulse continues to propagate through the half-bit line 105, through the series connecting line 107, through the half-bit line 106, across the component half-bit store 102, and through the terminating resistor 108 to ground.

The word pulse on line 109 and the bit pulse on the half-bit line 106 create an interacting magnetic force field operating on component half-bit store 102 to rotate the magnetic polarization thereof to a direction parallel to the arrow M but oppositely directed thereto. Thus, the component half-bit stores 101 and 102 attain oppositely polarized states of magnetization for the storage of an information bit value of "1," with the resultant salutary advantage of the opposing flux fields as hereinbefore set forth.

For sensing, or read-out, of information stored in a selected memory location, such as that constituted by the component half-bit stores 101 and 102, a read pulse, equivalent to a word pulse, is applied to word line 109. In the instance where a "0" has been stored at this location, the magnetic force field of the read pulse is directed parallel to the orientation of the magnetic polarization along the "hard axis" and thus no resultant rotation thereof occurs and no sense signal is induced on either of the half-sense lines 113 or 114. In the alternative, if a "1" has been stored at this memory location, the magnetic polarization of half-bit store 101 will be caused to rotate from an orientation parallel to, and of the same direction as the arrow M, to the rightwardly directed, hard axis position hereinbefore noted, thus inducing a half-sense signal on half-sense line 113 of positive polarity.

The magnetic polarization of half-bit store 102 will be caused to rotate from a direction parallel, but opposite to the arrow M to the rightwardly directed, hard axis position. Due to the opposite direction of rotation of the magnetic polarization of half-bit store 102 relative to that of half-bit store 101, a negative signal is induced in the half-sense line 114.

The signals thus induced propagate through the half-sense lines 113 and 114 to common mode trap 121 where they are differentially added, producing a full sense signal in output line 122. Since a stored "0" induces no signal in either of the half-sense lines 113 and 114, it will be appreciated that the presence of a signal in output line 122 represents a stored "1," whereas the absence of a signal at a time corresponding to the interrogation of a read signal on line 109 represents the storage of a "0."

The sources of noise discussed in relation to the system of FIG. 1 are inherently present in the system of FIG. 10. Thus, a read or word pulse propagating on line 109 will be capacitively coupled into the half-sense lines 113 and 114, 213 and 214, and 313 and 314. The spurious noise signal from the capactive coupling is of the same polarity in both associated half-bit lines such as 113 and 114, the differential addition performed in common mode trap 121 will cause such noise to be cancelled, rendering the full-sense signal on full sense output line 122 devoid of capacitively coupled spurious noise signals. In like fashion, common mode traps 221 and 321 provide cancellation of spurious noise from capacitive coupling to the half-sense lines 213, 214 and 313, 314, respectively.

As explained in relation to the system of FIG. 1, propagation of bit pulses in the system of FIG. 10 will cause inductively coupled noise signals to develop in the half-sense lines. Illustratively, the propagation of a bit signal through series-connected half-bit lines 105 and 106 induces spurious noise signals by inductive coupling into the respectively associated half-sense lines 113 and 114.

Due to the series-interconnecting lines 107, 207 and 307, a bit pulse propagates in opposite directions through the component half-bit lines 105 and 106, 205 and 206, and 305 and 306. Thus, the resultant magnetic flux fields of a given pair of component half-bit lines are in opposition, and therefore tend to cancel at a position remote therefrom. Illustratively, the resultant flux field from half-bit lines 205 and 206 will be greatly reduced and have little effect on half-sense lines 113 and 114. Further, the resultant flux field from half-bit lines 305 and 306, more remote therefrom, will be effectively nullified and have virtually no effect on half-sense lines 113 and 114.

However, the propagation of bit pulses in half-bit lines 105 and 106 will cause noise signals to be inductively coupled into the respectively associated half-sense lines 113 and 114. In like fashion, noise signals will be created in half-sense lines 213 and 214, and 313 and 314 from inductive coupling. Since these noise signals are of opposite polarity, they will be added in the common mode traps 121, 221 and 321, respectively, and be present with the full sense signals on full sense lines 122, 222 and 322.

The technique for achieving cancellation of the inductively coupled, spurious noise signals in the system of FIG. 10 is identical to that of the system of FIG. 1. Namely, a second array, B (not shown), identical to the array A and having concurrently pulsed bit lines but non-concurrently pulsed word lines is provided. As hereinbefore explained, array B may be independently operated to store information bit values. However, when registering or sensing information stored in array A, array B serves as a "noise generator," and provides an inductively coupled noise signal in the same manner as that produced in array A. This inductively coupled noise signal is supplied from array B through full-sense lines 221′, 222′ and 322′ simultaneously with the operation of array A in providing full-sense signals on lines 122, 222 and 322.

These full sense signals and the noise signals are differentially added in the respectively associated final common mode traps 123, 223 and 323. The differential addition cancels the inductively coupled spurious noise signals present on full-sense lines 122, 222 and 322. The output sense signals present on output lines 124, 224 and 324 are therefore devoid of both capacitive and inductively coupled noise signals for supply to sensing amplifiers 125, 225 and 325, respectively.

Many adaptations and variations in the systems of the invention, as hereinbefore set forth, will readily be apparent to those skilled in the art. For example, the dispersion-locked system of FIG. 10 may readily be adapted through the use of a bipolar bit drive source in place of the unipolar drive source 117, to provide storage of more than two digital information bit values in any given storage location. This results from the fact that the dispersion-locked mode effects selective storage of first and second complementary bit values with a rotation of the magnetic polarization through only 90°. Thus, in effect, a possibility of the selective storage of four distinct bit values may be achieved. Further, the systems of the invention may readily be adapted for use with a film having biaxial characteristics which also permits the possibility of storing increased distinct values of information.

The preferred systems of the invention hereinbefore set forth demonstrate its many salutary advantages, including not only cancellation of noise from drive signals, but also the reduction and elimination of various other interaction effects arising in prior art magnetic film systems. To those skilled in the art, many other embodiments and adaptations will be readily apparent and it is intended by the appended claims to cover all such modifications and adaptations of this invention as fall within its true spirit and scope.

What is claimed is:

1. A magnetic film storage system for registernig and sensing information bit values comprising:

(a) an array of bit storage locations in a magnetic film, each of said bit storage locations comprising first and second component half-bit stores, (b) first and second half-bit lines and first and second half-sense lines in inductively coupled relationship with said first and second component half-bit stores, respectively, (c) a word line in common inductively coupled relationship with both of said first and second component half-bit stores, (d) first means for pulsing said word line to create a first magnetic switching field thereabout, (e) second means for pulsing said first and second half-bit lines to create second magnitic switching fields of respectively opposite orientations thereabout, (f) said first and second means being operable to register a predetermined information bit value in a selected bit storage location by coincidently pulsing both said word line and said first and second half-bit lines associated therewith for driving said first and second component half-bit stores thereof to opposite magnetic remanence polarizations, (g) said first means further being operable to interrogate a selected bit storage location by pulsing said word line associated therewith to drive said first and second component half-bit stores thereof from said opposite magnetic remanence polarizations through oppositely directed rotations for inducing concurrently first and second sense signals of opposite polarity in the first and second half-sense lines respectively associated therewith, and (h) differential addition means connected to said first and second half-sense lines for differentially adding said concurrently induced first and second half-sense signals of opposite polarity to provide a full sense signal indicating the information bit value of said selected memory location.

2. A magnetic film storage system for registering and sensing information bit values comprising:

(a) an array of bit storage locations in a magnetic film, each of said bit storage locations comprising first and second component half-bits stores in immediately adjacent relation, (b) first and second half-bit lines and first and second half-sense lines in inductively coupled relationship with said first and second component half-bit stores, respectively, (c) a word line in common inductively coupled relationship with both of said first and second component half-bit stores, (d) first means for pulsing said word line to create a first magnetic switching field thereabout, (e) second means for pulsing said first and second half-bit lines to create second magnetic switching fields of respectively opposite orientations in either of a first or second relation thereabout, (f) said first and second means being operable to selectively register complementary first or second predetermined information bit values in a selected bit storage location by coincidently pulsing both said word line and said first and second half-bit lines associated therewith for driving said first and second component half-bit stores thereof to a corresponding first or second relation of opposite magnetic remanence polarizations, (g) said first means further being operable to interrogate a selected bit storage location by pulsing said word line associated therewith to drive said first and second component half-bit stores thereof from said corresponding first or second relation of opposite magnetic remanence polarizations through oppositely directed rotations for concurrently inducing first and second sense signals of opposite polarity of a corresponding first or second relation in the first and second half-sense lines respectively associated therewith, and (h) differential addition means connected to said first and second half-sense lines for differentially adding said concurrently induced first and second sense signals of opposite polarity to provide a full sense signal indicating the information bit value of said selected memory location.

3. A magnetic film storage system for registering and sensing information bit values comprising:

(a) an array of bit storage locations in a magnetic film, each of said bit storage locations comprising first and second half-bit stores in immediately adjacent relation with aligned axes of magnetic remanence polarizations, (b) first and second half-bit lines and first and second half-sense lines in inductively coupled relationship with said first and second component half-bit stores, respectively, (c) a word line in common inductively coupled relationship with both of said first and second component half-bit stores, (d) first means for pulsing said word line to create a first magnetic switching field thereabout, (e) second means for bipolarly pulsing said first and second half-bit lines to create second magnetic switching fields of respectively opposite orientations in a first or a second relation thereabout, (f) said first and second means being operable to register complementary first or second predetermined information bit values in a selected bit storage location by coincidently pulsing both said word line and said first and second half-bit lines associated therewith for driving said first and second component half-bit stores thereof to corresponding first or second relations of magnetic remanence polarizations effecting net cancellation of the opposed magnetic flux of said first and second component half-bit stores at a position remote from said bit storage location, (g) said first means further being operable to interrogate a selected bit storage location by pulsing said word line associated therewith to drive said first and second component half-bit stores thereof from either of said first or second relations of magnetic remanence polarizations through oppositely directed rotations for concurrently inducing first and second sense signals of opposite polarity of a corresponding first or second relation in said first and second half-sense lines respectively associated therewith, and (h) differential addition means connected to said first and second half-sense lines for differentially adding said concurrently induced first and second sense signals of opposite polarity to provide a full sense signal indicating the information bit value of said selected memory location.

4. A magnetic film storage system for registering and sensing information bit values comprising:

(a) an array of bit storage locations in a magnetic film of uniaxial anisotropy, each of said bit store locations comprising first and second component half-bit stores in immediately adjacent relation with aligned axes of magnetic remanence polarizations, (b) first and second half-bit lines and first and second half-sense lines in inductively coupled relationship with said first and second component half-bit stores, respectively, (c) a word line in common inductively coupled relationship with both of said first and second component half-bit stores, (d) first means for pulsing said word line to create a first magnetic switching field thereabout, (e) second means for bipolarly pulsing said first and second half-bit lines to create second magnetic switching fields of respectively opposite orientations in either of a first or second relation thereabout, (f) said first and second means being operable to selectively register complementary first or second information bit values in a selected bit storage location by coincidently pulsing both said word line and said first and second half-bit lines associated therewith for driving said first and second component half-bit stores thereof to corresponding first or second relations of opposite magnetic remanence polarizations along said aligned axes effecting net cancellation of the opposed magnetic flux of said first and second component half-bit stores at a position remote from said selected bit storage location, (g) said first means further being operable to interrogate a selected bit storage location by pulsing said word line associated therewith to drive said first and second component half-bit stores thereof from each of said first or second relations of magnetic remanence polarizations through oppositely directed rotations to a common polarization thereof transverse to said aligned axes for concurrently inducing first and second sense signals of opposite polarity of a corresponding first or second relation in the first and second half-sense lines respectively associated therewith, and (h) differential addition means connected to said first and second half-sense lines for differentially adding said concurrently induced first and second sense signals of opposite polarity to provide a full sense signal indicating the information bit value of said selected memory location.

5. A magnetic film storage system for registering and sensing information bit values comprising:

(a) an array of bit storage locations in a magnetic film operable in a dispersion-locked mode, each of said bit storage locations comprising first and second component half-bit stores in immediately adjacent relation with aligned easy axes and parallel hard axes of magnetic remanence polarizations, (b) first and second half-bit lines and first and second half-sense lines in inductively coupled relationship with said first and second component half-bit stores, respectively, (c) a word line in common inductively coupled relationship with both of said first and second component half-bit stores, (d) first means for pulsing said word line to create a first magnetic switching field thereabout, (e) second means for pulsing said first and second half-bit lines to create magnetic switching fields of respectively opposite orientations thereabout, (f) said first means being operable to register a first predetermined information bit value in a selected bit storage location by pulsing said word line associated therewith for driving said first and second component half-bit stores to alignment of the magnetic remanence polarizations thereof along said hard axes and said first and second means being operable to selectively register a second, complementary information bit value in said selected bit storage location by coincidently pulsing said word line and said first and second half-bit lines for driving said first and second component half-bit stores thereof to magnetic remanence polarizations aligned along said easy axes, (g) said first means further being operable to interrogate a selected bit storage location by pulsing said word line associated therewith to drive said first and second component half-bit stores thereof through oppositely directed rotations of the magnetic remanence polarizations from said alignment with said easy axes to alignment with said hard axes for concurrently inducing first and second sense signals of opposite polarity in the first and second half-sense lines respectively associated therewith, and (h) differential addition means connected to said first and second half-sense lines for differentially adding said concurrently induced first and second sense signals of opposite polarity to provide a full sense signal indicating the information bit value of said selected memory location.

6. A magnetic film storage system for registering and sensing information bit values comprising:

(a) an array of bit storage locations in a magnetic film, each of said bit storage locations comprising first and second component half-bit stores in immediately adjacent relation, (b) first and second half-bit lines and first and second half-sense lines in inductively coupled relationship with said first and second component half-bit stores respectively, (c) a word line in common inductively coupled relationship with both of said first and second component half-bit stores, (d) first means for pulsing said word line to create a first magnetic switching field thereabout, (e) second means for pulsing said first and second half-bit lines to create second magnetic switching fields of respectively opposite orientations thereabout, (f) said first means being operable to register a first predetermined information bit value in a selected bit storage location by pulsing said word line associated therewith for driving said first and second component half-bit stores thereof to a first relation of magnetic remanence polarizations and to register a complementary second predetermined information bit value in said selected storage bit location by coincidently pulsing both said word line and said first and second half-bit lines to drive said first and second component half-bit stores thereof to a second relation of magnetic remanence polarizations respectively, (g) said second means further being operable to concurrently pulse said first and second half-bit lines associated with first and second component half-bit stores of a bit storage location in said second array corresponding to said selected bit storage location in said first array, said pulsing generating first and second noise signals in said first and second half-sense lines associated with said corresponding bit storage location, (h) said first means further being operable to interrogate a selected bit storage location in said first array by pulsing said word line associated therewith to drive said first and second component half-bit stores thereof from at least one of said first and second relations of magnetic remanence polarizations through oppositely directed rotations for concurrently inducing first and second sense signals of opposite polarity in the first and second half-sense lines respectively associated therewith, (i) first differential addition means connected to said first and second half-sense lines of said selected bit storage location for differentially adding said concurrently induced first and second sense signals of opposite polarity to provide a full sense signal devoid of spurious noise signals from pulsing of said word line, (j) second differential addition means connected to said first and second half-sense lines of said corresponding bit storage location of said second array for differentially adding said first and second noise signals thereof to provide an output noise signal, and (k) third differential addition means connected to said first and second differential addition means for differentially adding said full sense signal and said output noise signal of said second array to provide an output sense signal devoid of spurious noise from the pulsing of said half-bit lines.

7. A magnetic film storage system for registering and sensing information bit values comprising:

(a) an array of bit storage locations in a magnetic film, each of said bit storage locations comprising first and second component half-bit stores in immediately adjacent relation, (b) first and second half-bit lines and first and second half-sense lines in inductively coupled relationship with said first and second component half-bit stores, respectively, (c) a word line in common inductively coupled relationship with both of said first and second component half-bit stores, (d) first means for pulsing said word line to create a first magnetic switching field thereabout, (e) second means for bipolarly pulsing said first and second half-bit lines to create second magnetic switching fields of respectively opposite orientations in a first or second relation thereabout, (f) said first and second means being operable to register complementary first or second predetermined information bit values in a selected bit storage location by coincidently pulsing said word line and said first and second half-bit lines associated therewith for driving said first and second component half-bit stores thereof to corresponding first and second relations of opposite magnetic remanence polarizations, (g) said second means further being operable to concurrently pulse said first and second half-bit lines associated with first and second component half-bit stores of a bit storage location in said second array corresponding to said selected bit storage location in said first array, said pulsing generating first and second noise signals in said first and second half-sense lines associated with said corresponding bit storage location, (h) said first means further being operable to interrogate a selected bit storage location in said first array by pulsing said word line associated therewith to drive said first and second component half-bit stores thereof from either of said first or second relations of magnetic remanence polarizations through oppositely directed rotations for concurrently inducing first and second sense signals of opposite polarity in a corresponding first or second relation in first and second half-sense lines respectively associated therewith, (i) first differential addition means connected to said first and second half-sense lines of said selected bit storage location for differentially adding said concurrently induced first and second sense signals of opposite polarity to provide a full sense signal devoid of spurious noise from pulsing of said word lines, (j) second differential addition means connected to said first and second half-sense lines of said corresponding bit storage location of said second array for differentially adding said first and second noise signals thereof to provide an output noise signal, and (k) third differential addition means connected to said first and second differential addition means for differentially adding said full sense signal and said output noise signal of said second array to provide an output sense signal devoid of spurious noise from the pulsing of said half-bit lines.

8. A magnetic film storage system for registering and sensing information bit values comprising:

(a) an array of bit storage locations in a magnetic film operable in a dispersion-locked mode, each of said bit storage locations comprising first and second component half-bit stores in immediately adjacent relation with aligned easy axes and parallel hard axes of magnetic remanence polarizations, (b) first and second half-bit lines and first and second half-sense lines in inductively coupled relationship with said first and second component half-bit stores, respectively, (c) a word line in common inductively coupled relationship with both of said first and second component half-bit stores, (d) first means for pulsing said word line to create a first magnetic switching field thereabout, (e) second means for pulsing said first and second half-bit lines to create second magnetic switching fields of respectively opposite orientations thereabout, (f) said first means being operable to selectively register a first predetermined information bit value in a selected bit storage location by pulsing said word line associated therewith for driving said first and second component half-bit stores to alignment of the magnetic remanence polarizations thereof along said hard axes and said first and second means being operable to selectively register a second, complementary information bit value in said selected bit storage location by coincidently pulsing said word line and said first and second half-bit lines for driving said first and second component half-bit stores thereof to magnetic remanence polarizations aligned along said easy axes, (g) said second means further being operable to concurrently pulse said first and second half-bit lines associated with first and second component half-bit stores of a bit storage location in said second array corresponding to said selected bit storage location in said first array, said pulsing generating first and second noise signals in said first and second half-sense lines associated with said corresponding bit storage location, (h) said first means further being operable to interrogate a selected bit storage location by pulsing said word line associated therewith to drive said first and second component half-bit stores thereof through oppositely directed rotations of the magnetic remanence polarizations from said alignment with said easy axes to alignment with said hard axes for inducing first and second sense signals of opposite polarity in the first and second half-sense lines respectively associated therewith, (i) first differential addition means connected to said first and second half-sense lines of said selected bit storage location for differentially adding said first and second sense signals to provide a full sense signal devoid of spurious noise from pulsing of said word line, (j) second differential addition means connected to said first and second half-sense lines of said corresponding bit storage location of said second array for differentially adding said first and second noise signals thereof to provide an output noise signal, and (k) third differential addition means connected to said first and second differential addition means for differentially adding said full sense signal and said output noise signal of said second array to provide an output sense signal devoid of spurious noise from the pulsing of said half-bit lines.

9. A magnetic film storage system for registering and sensing information comprising:

(a) an array of bit storage locations, each of said bit storage locations comprising first and second components half-bit stores in immediately adjacent relation with aligned axes of magnetic remanence polarizations, (b) means for registering a predetermined information bit value in a selected bit storage location to drive said component half-bit stores thereof to opposite magnetic remanence polarizations, (c) means for interrogating a selected bit storage location of said array by driving said first and second component half-bit stores thereof through oppositely directed rotations to produce concurrently first and second sense signals, respectively of opposite polarity, and (d) differential addition means for differentially adding said concurrently produced first and second sense signals of opposite polarity to provide a full sense signal indicating the information bit value of said selected bit storage location.

10. A magnetic film storage system for registering and sensing information comprising:

(a) an array of bit storage locations, each of said bit storage locations comprising first and second components half-bit stores in immediately adjacent relation with aligned axes of magnetic remanence polarizations, (b) registering means for selectively registering first and second complementary predetermined information bit values in a selected bit storage location of said array by driving saidfirst and second component half-bit stores thereof to first and second relations of opposite magnetic remanence polarizations along said aligned axes, (c) interrogating means for interrogating a selected bit storage location of said array by driving said first and second component half-bit stores thereof from either of said first and second relation of opposite magnetic remanence polarizations through oppositely directed rotations to produce concurrently first and second sense signals, respectively of opposite polarity in a corresponding first or second relation, and (d) differential addition means for differentially adding said concurrently produced first and second sense signals of opposite polarity to provide a full sense signal indicating the information bit value of said selected bit storage location.

11. A magnetic film storage system for registering and sensing information as recited in claim 10 wherein said registering means includes:

(a) first and second half-bit lines respectively associated with said first and second component half-bit stores, (b) a bipolar bit pulse source connected to said first and second half-bit lines for selectively supplying opposite polarity bit pulses of a first or second relation thereto, and (c) a word line associated with both said first and second component half-bit stores.

12. A magnetic film storage system for registering and sensing information as recited in claim 10 wherein said interrogating means includes first and second half-sense lines respectively associated with said first and second component half-bit stores and connected to said differential addition means.

13. A magnetic film storage system for registering and sensing information comprising:

(a) an array of bit storage locations, each of said bit storage locations comprising first and second component half-bit stores in immediately adjacent relation with aligned first axes and parallel second axes of magnetic remanence polarizations, (b) registering means for selectively registering first and second complementary predetermined information bit vlaues in a selected bit storage location of said array by driving said first and second component half-bit stores thereof to a first relation of opposite magnetic remanence polarizations along said aligned axes and a second relation of common magnetic remanence polarizations along said parallel axes, (c) interrogating means for interrogating a selected bit storage location of said array by driving said first and second component half-bit stores thereof from said first relation to said second relation of magnetic remanence polarizations through oppositely directed rotations to produce concurrently first and second sense signals, respectively, of opposite polarity, and (d) differential addition means for differentially adding said concurrently produced first and second sense signals of opposite polarity to provide a full sense signal indicating the information bit value of said selected bit storage location.

14. A magnetic film storage system for registering and sensing information as recited in claim 13 wherein said registering means includes:

(a) first and second series-connected half-bit lines respectively associated with said first and second component half-bit stores, (b) a unipolar bit pulse source connected to said first half-bit line for supplying unipolar bit pulses propagating in opposite directions through said first and second half-bit lines, and (c) a word line associated with both said first and second half-bit stores.

15. A magnetic film storage system for registering and sensing information as recited in claim 13 wherein said interrogating means includes first and second half-sense lines respectively associated with said first and second component half-bit stores and connected to said differential addition means.

16. A magnetic film storage system for registering and sensing information comprising:

(a) first and second arrays of bit storage locations, each of said bit storage locations comprising first and second component half-bit stores, (b) means for registering a predetermined information bit value in a selected bit storage location of said first array by driving said first and second component half-bit stores thereof to opposite magnetic remanence polarizations, (c) means for interrogating a selected bit storage location of said first array by driving said first and second component half-bit stores thereof through oppositely directed rotations to produce concurrently first and second sense signals, respectively, of opposite polarity, (d) first differential addition means for differentially adding said concurrently produced first and second sense signals of opposite polarity to provide a full sense signal indicating the information bit value of said selected bit storage location, (e) means for deriving a noise signal from said second array concurrently with the registering of interrogating of a selected bit storage location of said first array, and (f) second differential addition means for differentially adding said full sense signal and said noise signal.

References Cited

UNITED STATES PATENTS

| | | | |
|---|---|---|---|
| 3,096,510 | 7/1963 | Lee | 340—174 |
| 3,112,470 | 11/1963 | Barrett et al. | 340—174 |
| 3,195,117 | 7/1965 | Engelbart | 340—174 |
| 3,223,985 | 12/1965 | Bittmann et al. | 340—174 |
| 3,319,223 | 5/1967 | Amemiya et al. | 340—174 |

BERNARD KONICK, *Primary Examiner.*

VINCENT P. CANNEY, *Assistant Examiner.*